United States Patent [19]

Leman

[11] Patent Number: 5,242,668
[45] Date of Patent: Sep. 7, 1993

[54] PROCESS AND DEVICE FOR REDUCING FREE HALOGENS IN RESIDUAL GASSES

[75] Inventor: Gregory W. Leman, Savoy, Ill.

[73] Assignee: Cabot Corporation, Boston, Mass.

[21] Appl. No.: 791,814

[22] Filed: Nov. 13, 1991

Related U.S. Application Data

[63] Continuation-in-part of Ser. No. 614,779, Nov. 13, 1990, abandoned.

[51] Int. Cl.$^5$ ............................................... C01B 7/01
[52] U.S. Cl. ..................................... 423/241; 588/206
[58] Field of Search ................ 423/241, 486; 570/255; 588/206

[56] References Cited

U.S. PATENT DOCUMENTS 3,485,577 12/1969 Kraus .................................. 423/241
4,215,095 7/1980 Harris et al. ......................... 423/486

Primary Examiner—Michael Lewis
Assistant Examiner—Stuart L. Hendrickson
Attorney, Agent, or Firm—Harry J. Gwinnell

[57] ABSTRACT

An improved process and device for removing free halogen from residual gasses containing up to 15% by volume oxygen. Gaseous hydrocarbons and hydrogen are uniformly dispersed in the residual gasses either simultaneously or sequentially and preferentially reacted with the free halogen present before a competing reaction with oxygen can occur. The dispersion device includes an outer housing member, a centrally disposed second member which transports the residual gas from the burner through the cooling zone, and means for transporting gaseous hydrocarbons and hydrogen from the housing member to the second member for rapid and uniform dispersion in the residual gas stream.

15 Claims, 4 Drawing Sheets

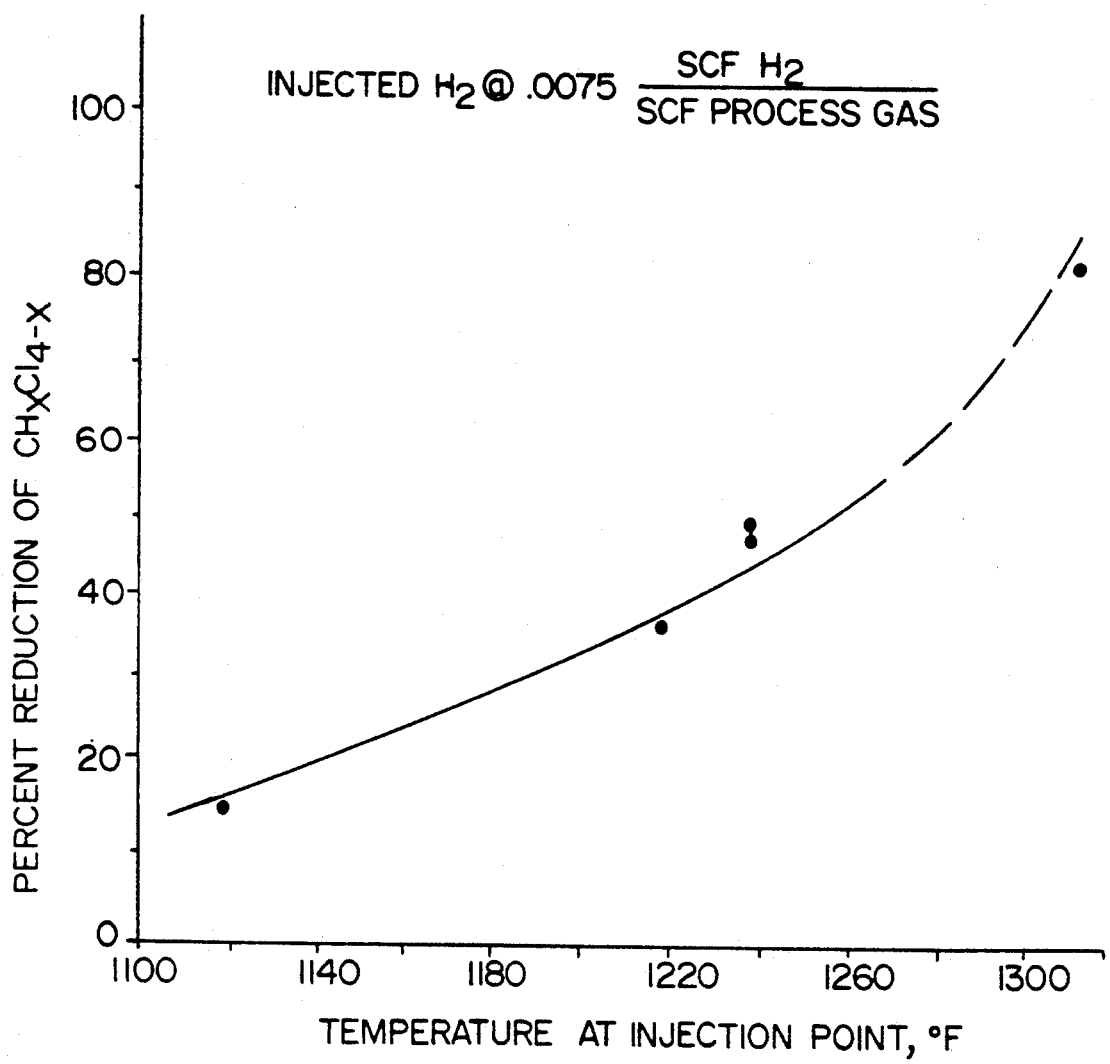

PROCESS AND DEVICE FOR REDUCING FREE HALOGENS IN RESIDUAL GASSES

This is a continuation of application Ser. No. 07/614,779 filed Nov. 13, 1992, now abandoned.

FIELD OF THE INVENTION

The invention pertains to the field of gas treatment process technology and more particularly, to a process for reducing the percentage by volume of free halogens in the reaction gasses from a hydrolytic conversion of a volatile metal halide in a flame by the rapid mixing of gaseous hydrocarbons and hydrogen therein.

BACKGROUND OF THE INVENTION

The production of fumed silica from chlorosilane feedstocks is well known in the art. The combustion of tetrachlorosilane with hydrogen and air in a pyrogenic burner is known. See for example Degussa, U.S. Pat. No. 4,276,274, German Patent 974,793, U.S. Pat. No. 2,990,249, U.S. Pat. No. 3,086,851, U.S. Pat. No. 3,006,738, German Published Application 2,153,671 corresponding to U.S. Pat. No. 3,954,945.

Where residual gasses are cooled with quench air, elevated oxygen levels are present. Typically, oxygen enriched residual gas streams produced by prior art methodologies include a range of components such as an aerosol oxide, about 0.5% free chlorine, less than about 15% oxygen, minor quantities of hydrogen, nitrogen, carbon dioxide, and trace materials in balance. After the fumed silica is removed, and the residual gas stream is introduced into an aqueous HCl absorber, the stream is either introduced into a caustic scrubber for chlorine removal, into an incinerator, or is vented into the atmosphere. Caustic scrubbing and incineration methodologies are expensive and include lengthy maintenance periods due to the corrosive nature of the gasses. Venting to the atmosphere is objectionable due to the economic loss associated with the foregone sale of hydrochloric acid.

Several attempts have been made to reduce chlorine emissions. For example, the use of low molecular weight hydrocarbons and hydrogen as reactants for the reduction of chlorine is disclosed in U.S. Pat. No. 3,485,577. Ore oxide is combined with a carbonaceous reducing material and reacted with chlorine gas. Oxygen released from the ore oxides is depleted by the carbonaceous material, forming residual gasses comprising unreacted chlorine, carbon dioxide, and carbon monoxide. Hydrogen or gaseous hydrocarbon is introduced by continuous or intermittent mixing systems including pressure reducing valves and pressure gauges. This approach is sensitive to residual gas temperature fluctuations; operating in a recommended range of 400° to 1300° C. and a preferred range of 800°–1300° C. The preferred temperature range is relatively high due to the depleted oxygen level in the system. In the recommended temperature range, chlorine would compete with oxygen for available reducing agents. In elevated oxygen systems, the available hydrogen would react preferentially to form water vapor in parts of the recommended and all of the preferred temperature ranges leaving chlorine in the residual gasses. More precise temperature control would be required to preferentially remove chlorine rather than oxygen. Where gaseous hydrocarbons are dispersed in the residual stream, the process of the '577 patent results in the presence of undesirable chlorinated hydrocarbons. A process for removing chlorine in a broad range of residual gas temperatures is therefore desirable.

The '274 Degussa patent pertains to a process for reducing the chlorine emissions in the residual gas stream generated by the hydrolytic combustion of volatile metal halides. Temperature is controlled to a point below which the reduction of chlorine by hydrogen is favored over the formation of water vapor. An excess stoichiometric amount of hydrogen of about 2.5:1 moles of chlorine is disclosed. The hydrogen is added at residual stream temperatures of from about 932° to 1292° F. by single or multiple port dispersion devices such as molded nozzles. Although approximately 93% chlorine conversion is achieved, the process is very sensitive to temperature fluctuations.

A process for nearly quantitative chlorine conversion in processes employing an air quench would be a desirable advancement in the art.

A further process for dehalogenating residual gasses is disclosed in U.S. Pat. No. 4,347,229 where a mixture of hydrogen and nitrogen is dispersed by means of a double jacketed pipe at temperatures between about 1022° to 1166° F. The pipe has two series of bores in the jacket through which the hydrogen can be introduced into the residual gas stream.

German Patent 1,244,125 pertains to a process to control chlorine in the residual gas stream where a 50 to 80% proportion of the residual gasses are recycled into a closed burner chamber thereby eliminating the addition of secondary air to the reactants. Processes where the burner conditions are modified often result in product variability and are therefore undesirable.

A process for treatment of residual gasses which results in reduced halogen and halogenated hydrocarbon emission levels in oxygen containing streams would be a significant improvement in the art.

Another object of the present invention is a process for producing high quality, finely divided oxides of metals or metal halides with residual gasses which ultimately contain reduced halogen levels, which uses conventional process equipment, and which operates in a broad temperature range.

Another objective of the present invention is a process for producing high quality, finely divided oxides of metal or halides with reduced halogen gas emissions by rapid dispersion of gaseous hydrocarbon and rapid dispersion of hydrogen by means which favor the reduction of free halogen and halogenated hydrocarbons.

Other objects will become known hereafter to those of ordinary skill in the art through the following specification, drawings, and claims as hereinafter provided.

BRIEF DESCRIPTION OF THE DRAWINGS

FIG. 6 illustrates a graph of Table 5 data.

Accordingly, a process is provided for treating residual gasses containing up to 15% oxygen and free halogens by the addition of gaseous hydrocarbons and hydrogen at multiple site locations in the cooling zone of the system. The residual gases are converted primarily into water soluble halogens, gaseous oxides of carbon such as carbon dioxide, and water vapor.

The present invention also comprises a rapid dispersion device which has an outer cylindrical housing member generally concentric with respect to an imaginary longitudinal axis. The housing member comprises radially spaced walls which define a chamber for transporting treatment gases. A centrally disposed second cylinder member transports the residual gas from the burner through the cooling zone of the system. Means are provided for transporting gaseous hydrocarbons and hydrogen from the housing chamber to the reaction cylinder for complete dispersion therein. Although a cylindrical member is identified, it is known to those skilled in the art that a variety of non-cylindrical configurations may be used without departing from the spirit and scope of the present invention.

Figure 1:
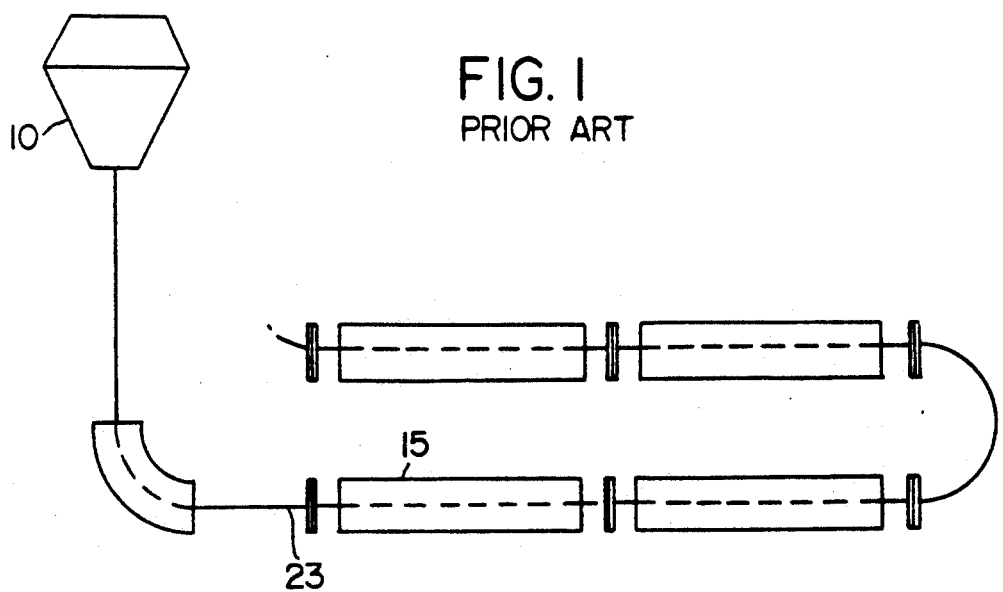
FIG. 1 is a schematic of the burner, cooling zone, and single dispersion site of a prior art system for the pyrogenic production of finely divided oxides of metal.

Referring now to FIG. 1, a schematic is illustrated detailing the burner and cooling portions of a typical system for the hydrolytic conversion of volatile halogens of metals and mixtures thereof. For purposes of convenience, the pyrogenic oxidation of chlorosilanes will be focused on.

Residual gasses such as chlorine, excess oxygen, and excess hydrogen are formed from the combustion of hydrogen with quantities of silicon tetrachloride, methyl trichlorosilane, and trichlorosilane. The gasses pass from reaction chamber 10 to cooling zone 15 where the temperature is maintained at approximately 500° to 700° C. The HCl formed by the reaction of hydrogen, oxygen and silicon tetrachloride in a flame undergoes a secondary reaction in the presence of excess oxygen according to the following equation:

$$4HCl + O_2 \rightarrow 2H_2O + 2Cl_2$$

Figure 2:
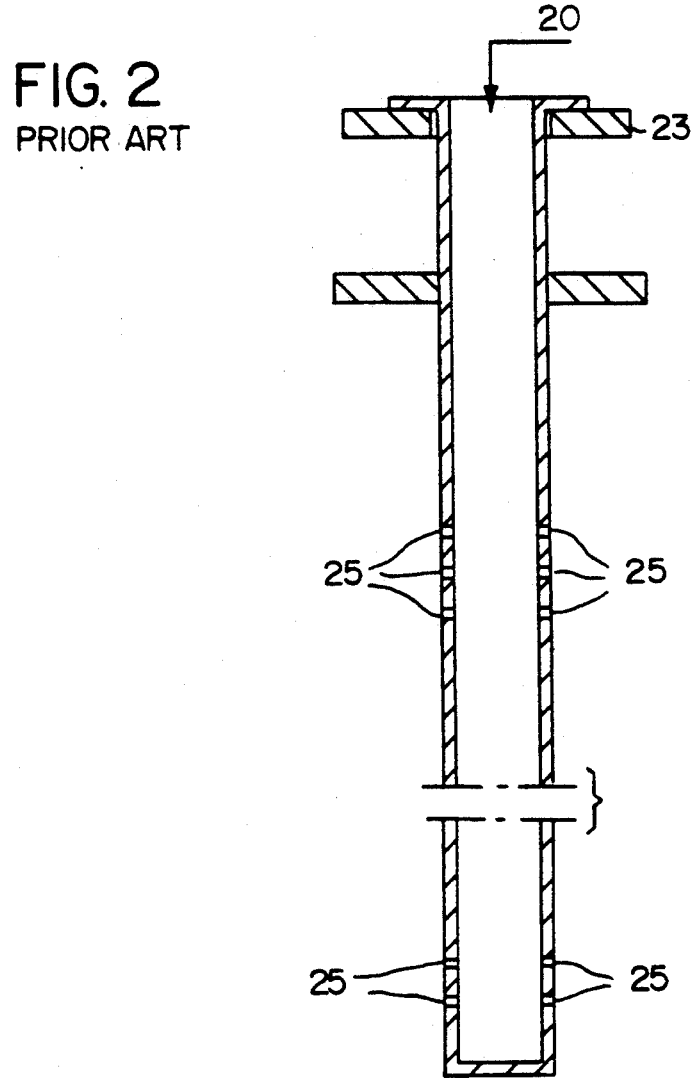
FIG. 2 illustrates a cross sectional view of a prior art dispersion device detailed in FIG. 1.

Referring to FIG. 2, a dispersion device of the prior art is illustrated. Hydrogen diluted with nitrogen is introduced through inlet tube 20 which is attached to the wall of the reaction system cooling zone 15 at site 23 and extends radially through the walls of the cooling tube section. Two series of bore holes 25 function to disperse the diluted hydrogen. The inventors have discovered that prior art methodologies and dispersions devices as illustrated in FIGS. 1 and 2, suffer from the inability to maximize local dispersion in the residual gas stream where the temperature is controlled in favor of free chlorine removal. It is theorized that logically high concentrations of hydrogen in the oxygenated stream bias the competing reactions in favor of water vapor formation rather than chlorine removal. Prior art methodologies and dispersions devices are therefore of diminished utility in elevated oxygen systems. As illustrated in Table 1 and described further in Example 1, less than 1% of the available free chlorine was removed where high oxygen or open pyrogenic burner conditions were employed in the system and conditions described.

Figure 3:
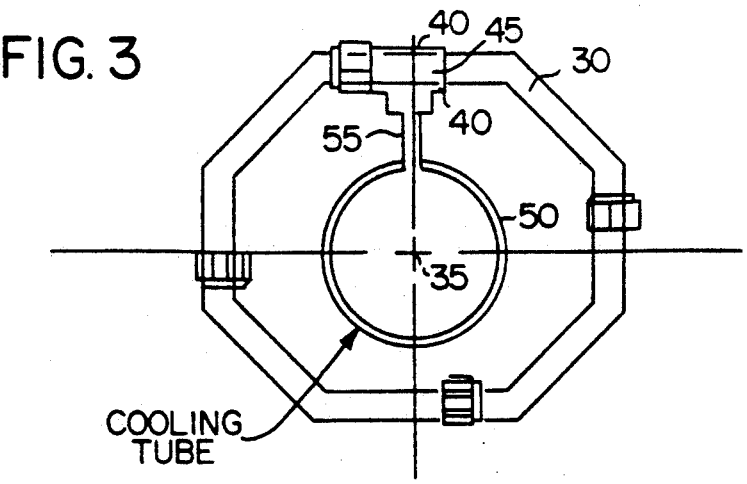
FIG. 3 is a sectional view of a dispersion device of the present invention.

Referring to FIG. 3, a dispersion device of the present invention is illustrated. The device has a generally cylindrical housing member 30 which is concentric with respect to imaginary longitudinal axis 35. The housing member 30 includes radially spaced walls 40 which define chamber 45 through which gasses are transported. A second cylindrical member 50, concentric with axis 35 and centrally disposed within housing member 30, transports residual gasses from burner 10 through the cooling zone 15. In one embodiment of the invention, a plurality of communication means illustrated as cylindrical tube 55 extends radially like a wheel spoke from chamber 45 to second member 50. Although only one tube is illustrated, it is preferable to employ a range of 4 to 8 depending on the concentration of free chlorine present in the residual gasses and the flow rates of treatment gasses employed. Gasses carried in housing member 30 are thereby transported by means 55 and uniformly dispersed within second member 50.

Figure 4:
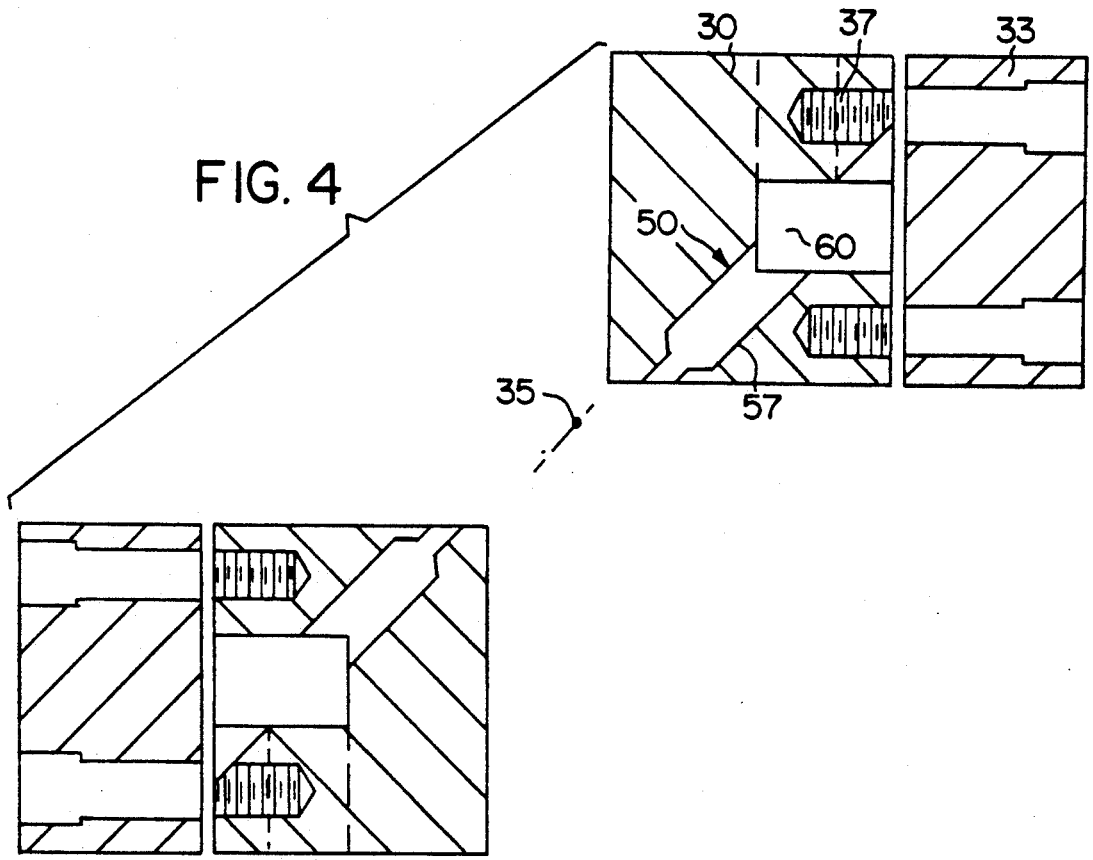
FIG. 4 is a sectional view of an alternate embodiment of the dispersion device of FIG. 3.

An alternate embodiment illustrated in FIG. 4 depicts chamber 45 of FIG. 3 as an annular passage 60 extending circumferentially within housing member 30. Passage 60 may be milled from the exterior surface of member 30 and sealingly enclosed by plate member 33 by bolts 37. High temperature sealing materials are known to those skilled in the art. Chamber 45 includes opposed flange members 50, 57 which extend radially with respect to imaginary axis 35, forming a circumferential slot. In yet a further embodiment, communication means 55 are oriented radially opposed with respect to each other and are bored from member 30 in a radial direction. Gasses carried in housing member 30 are uniformly dispersed within the residual gas stream of second member 50.

Although those skilled in the art will recognize that the dispersion time is dependent on several factors such as the velocity of the gas introduced, the diameter of cylindrical tube 50, and the flow characteristics of the residual gas; for purposes of the present invention, uniform dispersement shall be defined to exist for those conditions where for example, treatment gasses introduced into an 8 inch diameter carrying tube, at a flow rate of 370 ft/sec, achieve complete dispersion in about 0.05 seconds or less. A temperature profile of the reaction of gasses in the cooling zone and sampling of the extent of chlorine conversion provide the basis for calculating the dispersion time.

While nearly 98% chlorine conversion is obtained by introducing hydrogen with the dispersing means of the present invention, the mixing intensity, hydrogen dilution, and relatively narrow temperature range necessary to obtain high chlorine conversions, are factors which detract from the commercial application of the process. A process which is less sensitive to reaction temperatures and which maintains the elevated level of chlorine conversion disclosed above is a desirable improvement in the art.

Figure 5:
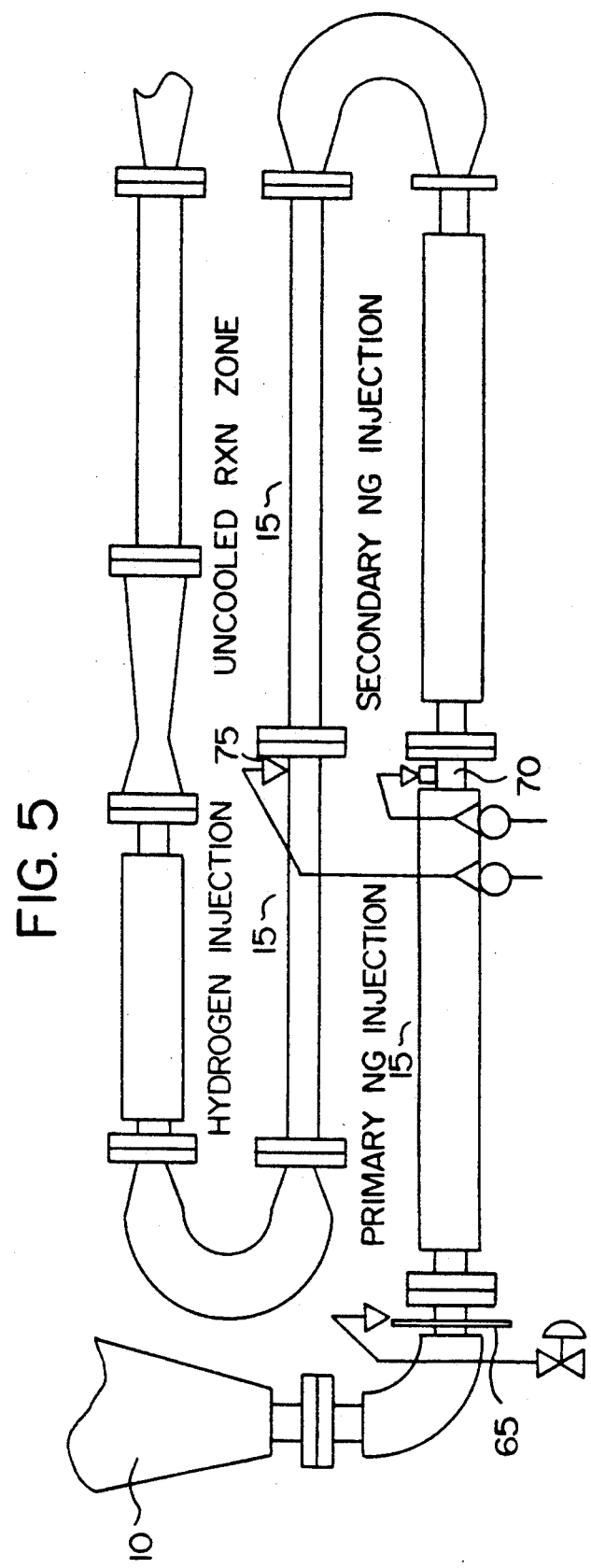
FIG. 5 illustrates a schematic of the burner, cooling zone, and multiple dispersant sites of the present invention.

The data of Table 4 illustrates the extent of chlorine conversion and chloromethane content in the residual gas stream due to the addition of natural gas at two separate sites 65, 70 in the cooling zone of FIG. 5. While natural gas was selected, gaseous hydrocarbons having the formula of $C_nH_{2n+2}$ where n is 1 to 4 is contemplated by the present invention.

As illustrated, the process apparatus, including burner 10 and cooling zone 15 of FIG. 1 was employed. The reactants and conditions disclosed in Example 4 were also used. At temperatures between about 1300° F. to 1420° F., up to 98% conversion of chlorine was achieved. Between about 20 to 100 ppmv of chloromethanes remained in the product gasses.

The inventor has discovered that further reductions in the total chloromethane content were achievable by the addition of a third dispersant site 75, down stream of the dispersion sites 65 and 70 of FIG. 6. As illustrated in the graph of FIG. 7, 35 to 80% of chloromethanes present were removed by the injection of hydrogen at product gas temperatures from 1220° F. to 1320° F. Reduced sensitivity to temperature an levels of chlorine and chloromethane conversion are thereby obtained.

EXAMPLE 1

Approximately 386 lb/h (pounds per hour) and 667 lb/h of methyltrichlorosilane and silicon tetrachloride was introduced to a CAB-O-SIL burner with 22,200 scfh (standard cubic feet per hour) of combustion (Com.) air and 3259 scfh of hydrogen. About 30 scfh of hydrogen was injected through the burner mantle to diminish mantle contamination. Approximately 27,800 scfh of quenching air was added to the residual gasses generated. The quenched residual gas stream contained 70.2% Nitrogen, 12.3% Oxygen, 14.6% Hydrochloric acid, 0.63% Chlorine, 1.77% Carbon Dioxide, and 0.55% Water by mole percent.

According to the prior art processes, hydrogen, diluted with nitrogen in a 5:1 by volume proportion was injected at a rate of about 100 to about 225 scfh while temperatures at the injection site were held to between about 925°–1075° F. The quantity of hydrogen introduced to the residual gasses formed a stoichiometric mole ratio of up to 1.5 with respect to free chlorine present in the residual gasses. The dispersion device consisted of a single pipe having a diameter of between a half an inch to a quarter of an inch diameter which radially traversed the outer housing of the cooling zone and the residual gas carrying member, and which projected into the center of the residual gas stream.

Gas samples taken from the residual stream by a reduced pressure line were bubbled through water. The aqueous solution formed was analyzed for chlorine content and HCl by titration with 0.1N sodium thiosulfate and silver nitrate respectively. A conversion of free chlorine to HCl of less than 1 percent was achieved as illustrated in the data of Table 1 below.

TABLE 1

| Load. | % MTCS | Com. $H_2$, SCFH | I. Temp. -°F. | $H_2$ I. rate | % Vol. $Cl_2$ SCFH | % Vol. HCL |
|---|---|---|---|---|---|---|
| 995 | 37.55 | 4074 | | | 0.36 | 11.16 |
| 995 | 37.55 | 4074 | 990 | 100 | 0.40 | 11.43 |
| 995 | 37.55 | 4074 | 990 | 120 | 0.43 | 12.06 |
| 995 | 37.44 | 4074 | | 0 | 0.48 | 14.98 |
| 995 | 37.44 | 4074 | | 0 | 0.49 | 15.32 |
| 995 | 37.44 | 4074 | 1023 | 100 | 0.48 | 15.39 |
| 995 | 37.44 | 4074 | 1023 | 120 | 0.48 | 14.98 |
| 995 | 37.17 | 4074 | | 0 | 0.44 | 15.22 |
| 995 | 37.17 | 4074 | | 0 | 0.45 | 14.61 |
| 995 | 37.17 | 4074 | 925 | 120 | 0.48 | 14.79 |
| 995 | 37.17 | 4074 | 925 | 148 | 0.44 | 14.47 |
| 1053 | 36.7 | 3259 | | 0 | 0.82 | 17.34 |
| 1053 | 36.7 | 3259 | | 0 | 0.69 | 16.83 |
| 1053 | 36.7 | 3259 | 1075 | 200 | 0.76 | 16.91 |
| 1053 | 36.7 | 3259 | 1075 | 225 | 0.76 | 17.28 |

EXAMPLE 2

The hydrolysis system illustrated in FIG. 1 was operated in accordance with the procedures of Example 1 and apparatus of FIG. 3 except as follows. A hydrogen and nitrogen gas mixture was combined in a volume to volume ratio of about 1.46 to 24.60 and was injected at a rate of about 430 to 2200 scfh into the residual gas stream. Temperatures at the injection site (I.TEMP.) were controlled in a range of about 970° F. to about 1170° F. The amount of hydrogen added to chlorine present in the residual gas was equivalent to a molar ratio of from about 0.55 to about 3.39. The result obtained are presented in Table 2 below. Chlorine conversion of as high as about 97% was achieved.

TABLE 2

SINGLE-STAGE HYDROGEN INJECTION DATA

| I. TEMP. °F. | $Cl_2$ RATE LBMOL/HR | $H_2$ /$Cl_2$ | $N_2$ /$H_2$ | FINAL $Cl_2$ VOL. % | % $Cl_2$ CONV |
|---|---|---|---|---|---|
| 1170 | 0.286 | 0.55 | 21.30 | 0.51 | 36.4 |
| 1170 | 0.286 | 0.92 | 12.80 | 0.35 | 57.9 |
| 1170 | 0.286 | 1.10 | 10.67 | 0.32 | 61.7 |
| 1050 | 0.360 | 0.60 | 24.60 | 0.25 | 59.9 |
| 1050 | 0.360 | 1.11 | 13.33 | 0.12 | 81.2 |
| 1050 | 0.360 | 1.94 | 7.62 | 0.02 | 96.7 |
| 1155 | 0.193 | 1.85 | 8.89 | 0.07 | 61.1 |
| 1155 | 0.193 | 3.29 | 5.00 | 0.18 | 8.2 |
| 1140 | 0.193 | 3.29 | 9.58 | 0.03 | 83.4 |
| 1060 | 0.174 | 3.14 | 10.36 | 0.01 | 95.0 |
| 1130 | 0.174 | 3.18 | 5.48 | 0.01 | 92.6 |
| 1130 | 0.174 | 1.82 | 9.58 | 0.01 | 92.0 |
| 1010 | 0.157 | 1.68 | 10.00 | 0.08 | 46.5 |
| 1010 | 0.157 | 2.53 | 6.67 | 0.09 | 45.1 |
| 970 | 0.157 | 2.53 | 13.67 | 0.11 | 27.9 |
| 1070 | 0.181 | 1.53 | 8.38 | 0.07 | 83.3 |
| 1090 | 0.181 | 1.53 | 3.05 | 0.44 | 3.7 |
| 1090 | 0.181 | 2.98 | 3.05 | 0.44 | 0.0 |
| 1085 | 0.181 | 3.05 | 3.95 | 0.44 | 0.0 |
| 1110 | 0.230 | 1.26 | 5.64 | 0.35 | 31.0 |
| 1110 | 0.230 | 2.41 | 2.95 | 0.50 | 0.0 |
| 1130 | 0.230 | 1.26 | 2.91 | 0.54 | 0.0 |
| 1130 | 0.230 | 2.41 | 1.46 | 0.52 | 0.0 |
| 1050 | 0.259 | 1.06 | 3.81 | 0.64 | 2.3 |
| 1050 | 0.259 | 1.46 | 2.76 | 0.64 | 0.0 |
| 1060 | 0.259 | 1.06 | 5.45 | 0.21 | 67.7 |
| 1060 | 0.259 | 1.46 | 4.14 | 0.44 | 29.6 |
| 1020 | 0.225 | 1.06 | 6.44 | 0.16 | 65.8 |
| 1020 | 0.225 | 1.50 | 4.64 | 0.10 | 78.8 |

EXAMPLE 3

The procedures and apparatus of Example 2 were used except as otherwise described. Natural gas was introduced into the residual gas stream at a single site location while the temperature of the site was maintained at from 1170° F. to about 1370° F. The molar ratio of methane to chlorine was between 0.5 to 0.75. The dilution ratio of nitrogen to natural gas was from 0 to 15.80. Conversion of chlorine of as high as about 98% was achieved as illustrated below in Table 3.

TABLE 3

SINGLE-STAGE NATURAL GAS INJECTION DATA

| I. % TEMP. F. | $Cl_2$ RATE LBMOL/ HR | "$CH_4$" /$Cl_2$ RATIO | $N_2$/ "$CH_4$" RATIO | FINAL $Cl_2$ VOL. % | % $Cl_2$ CONV |
|---|---|---|---|---|---|
| 1370 | 0.414 | 0.50 | 5.08 | 0.55 | 46.0 |
| 1370 | 0.414 | 0.75 | 3.39 | 0.21 | 79.5 |
| 1360 | 0.414 | 0.75 | 2.80 | 0.10 | 91.8 |
| 1350 | 0.414 | 0.75 | 5.90 | 0.07 | 94.1 |
| 1350 | 0.414 | 0.50 | 9.00 | 0.31 | 73.9 |
| 1230 | 0.271 | 0.50 | 7.70 | 0.22 | 74.4 |
| 1230 | 0.271 | 0.75 | 5.22 | 0.04 | 95.4 |
| 1170 | 0.271 | 0.75 | 10.70 | 0.05 | 94.5 |
| 1170 | 0.271 | 0.50 | 15.80 | 0.16 | 80.4 |
| 1200 | 0.271 | 0.50 | 0.00 | 0.22 | 75.0 |
| 1200 | 0.271 | 0.75 | 0.00 | 0.02 | 97.7 |

EXAMPLE 4

The reaction according to the procedures and apparatus of Example 2 were used except as follows. Natural Gas was introduced to the residual gas stream at two site locations in the cooling tube. Both sites utilized the dispersion devise of FIG. 3. Site temperatures were held in the range of 1280°–1460° F. and 1180°–1440° F. respectively. Natural Gas was injected into the residual gas stream at stoichiometric ratios (H/Cl) of 1 to 1.4 and 0.10 to 0.35 per site. Samples were taken downstream of the second injection site and analyzed by mass spectrometer for chloromethane content. A range of about 5 to about 100 ppm was found for the temperatures and conditions discussed. Chlorine conversion (CONV.) to HCl of up to 98% was achieved. The results obtained are set forth below in Table 4.

stoichiometric ratio of hydrogen to chlorine in the untreated gas stream of between 0.5 and 2.0 was used. Where the quantity of hydrogen introduced formed a ratio of about 1 with respect to chlorine and the injection temperature was controlled at about 1240° F. to 1320° F., total chloromethane levels were reduced to less than 30 ppmv. (parts per million volume) Table 5 is illustrates the extent of chloromethane conversion in the residual gasses as a result to hydrogen addition.

TABLE 5

TWO-STAGE NATURAL GAS INJECTION WITH HYDROGEN INJECTION FOR CHLOROMETHANE REDUCTION

| TEMP. 1 DEG. F. | TEMP 2 DEG. F. | TEMP 3 DEG. F. | STOIC. RATIO 1 | STOIC. RATIO 2 | H2 FLOW (SCFH) | FINAL CL2 VOL % | CL—METH PPM V |
|---|---|---|---|---|---|---|---|
| 1280 | 1260 | N/A | 1.47 | 0.32 | 0 | 0.01 | 61.9 |
| 1280 | 1260 | 1220 | 1.47 | 0.32 | 114 | 0.01 | 39.7 |
| 1180 | 1160 | N/A | 1.40 | 0.30 | 0 | 0.03 | 141.2 |
| 1200 | 1160 | 1120 | 1.40 | 0.30 | 114 | 0.01 | 120.6 |
| 1400 | 1280 | N/A | 1.40 | 0.30 | 0 | 0.01 | 58.2 |
| 1380 | 1280 | 1240 | 1.40 | 0.30 | 114 | 0.01 | 29.9 |
| 1420 | 1390 | N/A | 1.40 | 0.20 | 0 | 0.19 | 15.4 |
| 1440 | 1400 | 1240 | 1.40 | 0.20 | 114 | 0.08 | 8.2 |
| 1440 | 1410 | 1320 | 1.40 | 0.20 | 300 | 0.04 | 3.3 |
| 1370 | 1400 | N/A | 1.63 | 0.20 | 0 | 0.06 | 9.24 |
| 1370 | 1400 | 1280 | 1.63 | 0.20 | 114 | 0.06 | 7.89 |
| 1370 | 1380 | 1260 | 1.63 | 0.20 | 70 | 0.07 | 7.51 |

In another embodiment of the present invention both the gaseous hydrocarbon and the gaseous hydrogen are introduced simultaneously. The volume percents, temperatures, etc. are the same as the sequential addition except that the reactions as described in the sequential addition take place at one time. The key to success both in the sequential and simultaneous gas additions is to add sufficient amounts of hydrocarbon and hydrogen

TABLE 4

TWO-STAGE NATURAL GAS INJECTION DATA

| T1 °F. | T2 °F. | Cl2 RATE LBMOL/HR | STOIC. RATIO 1 | STOIC. RATIO 2 | Cl2 VOL % | TOTAL CL—METH PPMV |
|---|---|---|---|---|---|---|
| 1280 | 1200 | 0.29 | 1.0 | 0.10 | 0.100 | 8.00 |
| 1280 | 1180 | 0.29 | 1.0 | 0.20 | 0.020 | 9.04 |
| 1300 | 1190 | 0.29 | 1.2 | 0.17 | 0.090 | 54.50 |
| 1300 | 1200 | 0.29 | 1.2 | 0.35 | 0.020 | 86.20 |
| 1300 | 1210 | 0.29 | 1.4 | 0.15 | 0.060 | 59.50 |
| 1300 | 1210 | 0.29 | 1.4 | 0.30 | 0.010 | 99.20 |
| 1300 | 1320 | 0.40 | 1.0 | 0.10 | 0.170 | 44.40 |
| 1300 | 1340 | 0.40 | 1.0 | 0.20 | 0.090 | 41.00 |
| 1370 | 1310 | 0.40 | 1.0 | 0.10 | 0.230 | 32.30 |
| 1355 | 1280 | 0.40 | 1.0 | 0.20 | 0.090 | 38.30 |
| 1360 | 1300 | 0.40 | 1.2 | 0.17 | 0.190 | 19.40 |
| 1370 | 1280 | 0.40 | 1.2 | 0.35 | 0.040 | 42.70 |
| 1370 | 1280 | 0.40 | 1.4 | 0.15 | 0.050 | 18.10 |
| 1360 | 1280 | 0.40 | 1.4 | 0.30 | 0.020 | 44.10 |
| 1380 | 1320 | 0.48 | 1.2 | 0.35 | 0.030 | 32.10 |
| 1420 | 1350 | 0.48 | 1.4 | 0.30 | 0.020 | 28.70 |
| 1460 | 1400 | 0.47 | 1.0 | 0.10 | 0.310 | 24.20 |
| 1440 | 1390 | 0.47 | 1.0 | 0.20 | 0.210 | 24.60 |
| 1450 | 1370 | 0.47 | 1.2 | 0.17 | 0.340 | 17.70 |
| 1450 | 1390 | 0.47 | 1.2 | 0.35 | 0.030 | 23.50 |
| 1440 | 1430 | 0.47 | 1.4 | 0.15 | 0.005 | 13.50 |
| 1440 | 1440 | 0.47 | 1.4 | 0.30 | 0.005 | 89.80 |
| 1460 | 1400 | 0.38 | 1.4 | 0.15 | 0.120 | 6.60 |
| 1460 | 1400 | 0.38 | 1.4 | 0.30 | 0.110 | 4.80 |

EXAMPLE 5

The procedures and apparatus of Example 4 were used in the present Example. In addition, hydrogen was injected at a location site subsequent to the two previously designated sites for natural gas addition. A quantity of hydrogen was introduced at a rate of about 70–300 scfh while temperatures for the three dispersion sites were maintained in the range of 1120°–1400° F. A such that temperatures between 1300° F. and 1500° F., preferably 1350° F. to 1450° F., and most preferably 1400° F. are reached and maintained during gaseous reaction.

EXAMPLE 6

The procedures and apparatus of Example 3 were used except as otherwise described. Both the natural gas and hydrogen were introduced into the residual gas stream at a single site location while the temperature of the site was maintained at from 1170° F. to about 1370° F. The molar ratio of methane to chlorine was between 0.5 to 0.75. A stoichiometric ratio of hydrogen to chlorine in the untreated gas stream of between 0.5 and 2.0 was used. Conversion of chlorine of as high as about 99% was achieved. The total chloromethane level when treating chlorine by this process was as low as 3 ppmv up to 30 ppmv, with 6 to 9 ppmv most common.

As a result of the primary reactions which generate the residual gasses of interest present in the present process, the residual gasses will typically contain anywhere from about 100 parts per million to 5% by volume of chlorine gas, typically 0.25 percent to 1.2 percent, and most typically 0.5 percent to 1 percent chlorine. There should be enough methane (or others gaseous hydrocarbon) added to the system to provide a slight excess to react with all of this chlorine in the system. The specific amount can be easily calculated by one skilled in this art based on the moles of chlorine in the system.

The amount of hydrogen in the system should be enough to convert all of the halogenated hydrocarbon in the presence of the less than 15% oxygen to oxides of carbon, water soluble halogen compounds and water vapor. This amount of hydrogen is typically at least 0.1 percent by volume, more typically 0.35 percent to 0.7 percent by volume, and most typically for the residual gas system described in the present application, about 0.5 percent by volume.

The oxygen is always present in the residual gas system throughout the reactions described. This oxygen content is less than 15 percent by volume and is typically reduced by about 2 percent by volume by virtue of the gaseous hydrocarbon reaction with the residual gasses under the conditions described in the present application. While the system of the present invention typically has an oxygen content less than 15 percent by volume, more typically about 8 percent up to about 15 percent, and most typically about 12 percent, it is still workable with oxygen contents less than these volume. However, the key advantage of the present invention, is the fact that it can work in these high oxygen contents which is not typical of systems of the prior art.

Alternate embodiments of the present invention will be apparent to those skilled in the art without departing from the scope of the present invention. For example, the present invention applies equally to other processes such as the halogenation of metals and metal oxides. Similarly, the use of alternate feed stock materials besides silicontetrachloride and combustion gasses besides hydrogen, air, and natural gas may be used without departing from the scope of the present invention. Burner conditions may also be varied due to the availability of combustion materials or feedstocks. The residual gasses generated may therefore depart from the specific compositions and concentrations of free chlorine presented without departing from the scope of the invention.

I claim:

1. A process for treating residual gases containing elemental halogen in the presence of $O_2$ gas, the elemental halogen being present in an amount by volume of 100 parts per million to 5%, the $O_2$ gas being present by volume in an amount about 8% to about 15%, said process comprising the steps of:

introducing a sufficient quantity of gaseous hydrocarbon to said residual gasses to provide at least 2 hydrogen atoms per mole of elemental halogen, by at least one dispersion means, wherein said means provides for uniform dispersion of said gaseous hydrocarbon within said residual gasses, converting substantially all of said elemental halogen to water soluble halogen compounds and product gasses comprising halogenated hydrocarbons and water vapor, introducing at least 0.1% by volume of gaseous hydrogen to said product gasses by at least one dispersion means, said product gasses still containing $O_2$ gas in an amount about 8% to about 15% by volume, wherein said means provides for uniform dispersion of said gaseous hydrogen within said product gasses, and converting substantially all of said halogenated hydrocarbons to oxides of carbon, water soluble halogen compounds, and water vapor, wherein said gaseous hydrocarbon and gaseous hydrogen are introduced to said residual and product gasses at gas temperatures of between about 1060° F. to about 1450° F., and removing said water soluble halogen compounds from the process.

2. A process for treating residual gases containing elemental halogen in the presence of $O_1$ gas, the elemental halogen being present in an amount by volume of 100 parts per million to 5%, the $O_2$ gas being present by volume in an amount about 8% to about 15%, said process comprising the steps of:

introducing a sufficient quantity of gaseous hydrocarbon to said residual gasses to provide at least 2 hydrogen atoms per mole of elemental halogen, by at least one dispersion means, wherein said means provides for uniform dispersion of said gaseous hydrocarbon within said residual gasses, simultaneously introducing at least 0.1% by volume of gaseous hydrogen to said product gasses by at least one dispersion means, wherein said means provides for uniform dispersion of said gaseous hydrogen within said product gasses, and converting substantially all of said elemental halogen to water soluble halogen compounds, wherein said gaseous hydrocarbon and gaseous hydrogen are introduced to said residual and product gasses at gas temperatures of between about 1060° F. to about 1450° F., and removing said water soluble halogen compounds from the process.

3. The process of claim 1 wherein said gaseous hydrocarbon corresponds to the formula $C_nH_{2n+2}$ and n is 1 to 4.

4. The process of claim 3 wherein said gaseous hydrocarbon is methane.

5. The process of claim 3 wherein said gaseous hydrocarbon is natural gas.

6. The process of claim 5 wherein said reaction temperature is between about 1120° F. to about 1400° F.

7. The process of claim 2 wherein said quantity of gaseous hydrocarbon introduced forms a stoichiometric ratio with respect to free halogen present in the residual gasses of less than about 1.5.

8. The process of claim 2 wherein said quantity of gaseous hydrogen introduced forms a stoichiometric ratio with respect to free halogen present in the residual gasses of less than about 2.

9. A process for removing free halogen from residual gasses wherein said residual gasses comprise a mixture of gasses containing $O_2$ gas, the $O_2$ gas being present in an amount about 8% to about 15% by volume free $O_2$ gas, wherein said gasses are generated by the hydrolytic conversion of volatile halogens of metals and mixtures thereof, said process comprising the steps of:

introducing a quantity of gaseous hydrocarbon to said residual gasses by at least one dispersion means, wherein said means provides for uniform dispersion of said gaseous hydrocarbon with said residual gasses, said quantity of hydrocarbon being no greater than about 1.5 times the amount of free halogen present in the residual gasses, reacting said gaseous hydrocarbon with said residual gasses, converting substantially all of said free halogens to water soluble halogen compounds and product gasses comprising halogenated hydrocarbons and water vapor, introducing a quantity of gaseous hydrogen to said product gasses by at least one dispersion means, wherein said means provides for uniform dispersion of said gaseous hydrogen with said product gasses, said quantity of hydrogen being no greater than about 1 times the amount of free halogen present in the residual gasses, reacting said gaseous hydrogen with said product gasses, converting substantially all of said halogenated hydrocarbons to oxides of carbon, water soluble halogens and water vapor, wherein said gaseous hydrocarbon and gaseous hydrogen are introduced to said residual and product gasses at gas temperatures of between about 1060° F. to about 1450° F., and removing said water soluble halogens from the process.

10. The process of claim 9 wherein said gaseous hydrocarbon is introduced to said residual gasses by dispersion means at two separate locations prior to hydrogen introduction.

11. The process of claim 9 wherein said gaseous hydrocarbon corresponds to the formula $C_nH_{2n+2}$ and n is 1 to 4.

12. The process of claim 9 wherein said gaseous hydrocarbon is natural gas.

13. The process of claim wherein said gaseous hydrocarbon is methane.

14. The process of claim 12 wherein said gaseous hydrocarbon and hydrogen are introduced at residual and product gas temperatures between about 1200° to about 1350° F.

15. The process of claim 14 wherein said hydrogen introduction occurs at a product gas temperature of between about 1280° to about 1350° F.

* * * * *